Nov. 2, 1954    N. McK. HEATH    2,693,198
AUTOMATIC SHUTOFF VALVE
Filed April 26, 1951
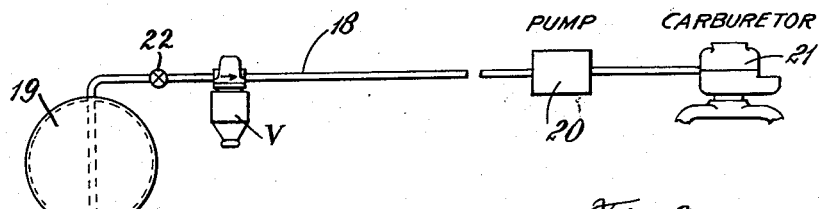
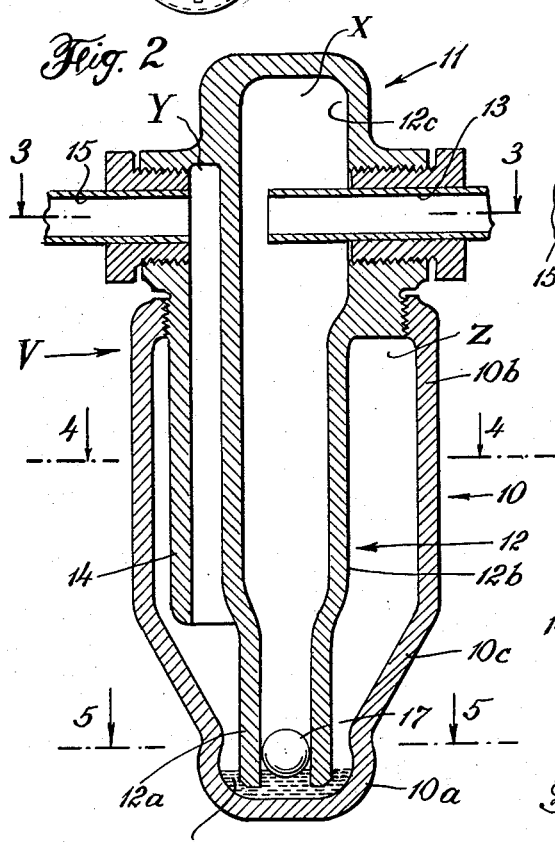
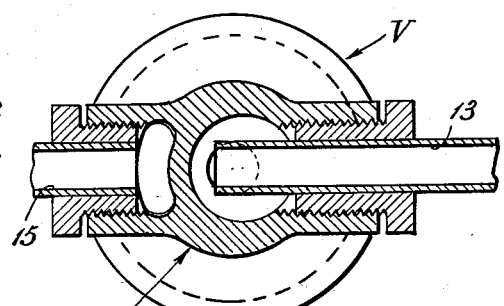
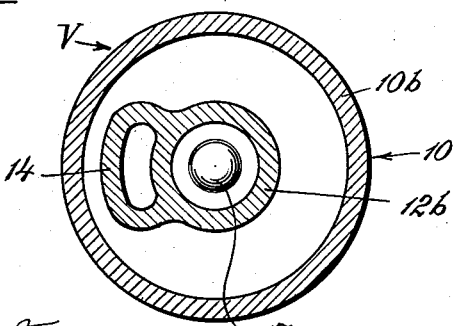
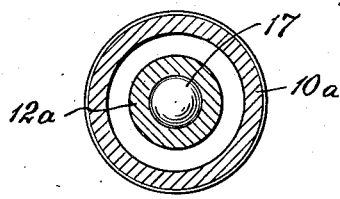
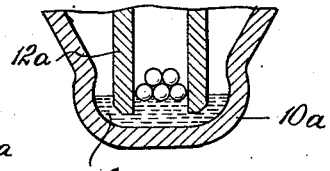
INVENTOR
Neill McKay Heath
BY
Pennie Edmonds Morton Barrows & Taylor
ATTORNEYS

2,693,198

AUTOMATIC SHUTOFF VALVE

Neill McKay Heath, Jacksonville, Fla.

Application April 26, 1951, Serial No. 223,057

9 Claims. (Cl. 137—251)

This invention relates to automatic shut-off valves for installation in a line, through which liquid is drawn by a pump or like means, and is concerned more particularly with a novel valve of the kind referred to, which automatically closes the line to prevent flow of liquid therethrough, when the pump stops or fails to function properly or when a leak or break occurs in the line between the valve and the pump. The new valve is of simple, inexpensive construction with no parts requiring attention or adjustment in service, and, each time it operates, it not only effectively shuts off flow but also draws back toward it part of the liquid in the line, so that there will be no dripping or leakage at a break in the line. The valve is of particular advantage for marine use on craft powered with gasoline engines, since it prevents gasoline from leaking into the bilge and thus eliminates the hazard of fire or explosion.

The new valve comprises a closed vessel having an inlet, which is to be connected to the line from the fuel tank and leads into the interior of the vessel below the middle of the vessel. The lower end of the vessel is formed as a sump containing a quantity of sealing liquid, perferably mercury, and the vessel contains an upright outlet tube having a closed top and an open lower end lying in the sump below the normal level of the sealing liquid. The internal volume of the outlet tube is substantially less than that of the vessel outside the tube and above the sealing liquid, and an outlet leads from the interior of the tube below the closed top thereof and is to be connected to the line leading to the intake of the pump. The outlet tube is made of two sections of different diameter, the lower section being of the less diameter, and the tube contains weighting means, preferably taking the form of a metal ball of slightly less diameter than the lower section of the tube and normally lying at the bottom of the tube in contact with the sealing liquid.

For a better understanding of the invention, reference may be made to the accompanying drawing, in which:

Fig. 1 is a diagrammatic elevational view of a fuel supply system including the new valve;

Fig. 2 is a vertical sectional view of one form of the new valve;

Figs. 3, 4, and 5 are sectional views on the lines 3—3, 4—4, and 5—5, respectively of Fig. 2; and Fig. 6 is a fragmentary vertical sectional view of the valve containing another form of weighting means.

The new valve V in the form shown in the drawing includes a vessel 10, preferably cast from a suitable metal and having a closed lower end section 10a formed as a sump. Section 10a is of less diameter than the main part 10b of the vessel and is connected thereto by a tapered intermediate section 10c. The top end opening of the main section 10b is internally threaded and closed by a cap 11 screwed into the opening.

The cap 11 is formed with an outlet tube 12, the lower part of which is formed as a guide section 12a having an open lower end lying within the sump, when the cap is in place on the vessel. Above the guide section, outlet tube 12 has an upper section 12b of greater diameter than the guide section and the tube may have a top section 12c of greater diameter than section 12b and lying above the top of the vessel. The top of the outlet tube 12 is closed and a pipe 13 is threaded into an opening through the wall of the tube below the top thereof. The pipe extends across the tube and terminates a short distance from the wall of the tube opposite the opening.

An inlet leads into the interior of the vessel below the middle thereof and, in order that the inlet and outlet connections may be at the same level for convenience in installation, the cap is formed with an inlet tube 14 extending along the outer side of the outlet tube 12 and terminating at its lower end within the tapering section 10c of the vessel. An inlet pipe 15 is then threaded into an opening through the wall of the cap and leads to the interior of the inlet tube 14 below the closed upper end thereof. If desired, the inlet pipe can be threaded in an opening through the wall of the vessel at about the level, where the inlet pipe is shown as terminating in the drawing, but the arrangement illustrated is preferred.

A pool of sealing liquid 16 lies within the sump with its level normally above the lower end of tube 12. The liquid preferred is mercury, because it is heavier than other available sealing liquids and it is unaffected by gasoline or water contained therein. A relatively heavy ball 17, preferably of steel, rests upon the mercury within the outlet tube and the ball has a diameter only slightly less than the inner diameter of the guide section 12a of the tube.

The valve V is installed in the fuel line 18 between the tank 19 and the fuel pump 20, beyond which lies the carburetor 21. The tank illustrated is of the top outlet type with the line 18 leading from near the bottom of the tank upwardly and out through the outlet. If preferred, the tank may have a bottom outlet. In the installation shown, the line leads downward from the top of the tank to below the bottom of the tank. A manual shut-off valve 22 may be placed in the line between the tank and valve V, if desired, valve 22 being normally open. It is desirable to place the automatic shut-off valve V close to the tank.

The operation of the new valve is as follows: When the engine is started and the fuel pump is operating, the pump first evacuates the line between the pump and valve V and also the interior of the outlet tube 12, including the space X within the tube above the level of the top of the pipe 13. The suction of the pump then raises the ball 17 and some of the mercury upward into the upper section 12b of the tube and fuel is drawn from the tank and through the inlet tube 14 into the body of the valve. The fuel is then drawn up into the lower end of the outlet tube and flows therethrough and out through pipe 13. As the fuel is drawn into the inlet pipe, the space Y in the pipe above the level of the top of the inlet pipe 15 is evacuated and, during the flow of fuel through the valve, the space Z within the valve outside the inlet and outlet tubes and above the level of the mercury is also evacuated. During the flow of fuel upwardly through the outlet tube, the ball moves up and down with a random motion within the upper section 12b of the tube and globules of mercury rise with the fuel into section 12b of the outlet tube and then sink back to the pool in the sump. Escape of the ball from the outlet tube is prevented by the extension of pipe 13 across tube 12 and the ball impedes the globules of mercury, so that they do not escape into the line 18.

When the pump stops or if a break occurs in the line between valve V and the pump, so that the suction at the outlet of the valve is lost, the fuel within the outlet tube up to the level of the top of the outle pipe drops down through the tube and some of the fuel displaces the mercury in the sump and rises in the body of the valve outside the tube. Similarly, fuel flows in through the inlet tube toward the lower end of the body of the valve, until the air remaining in space Z has been compressed to atmospheric pressure by the fuel rising within the tapering section 10c. The partial vacuum in space X draws the fuel back through line 18 beyond the valve, so that, at a break or leak in the line, there is an empty space in the line between the break or leak and the end of the column of fuel in the line. This prevents dripping at the leak or break. The provision of the space Y seems to make the valve work better, although the space is not essential. Space Y is much smaller than space X, which is one-quarter or less the volume of space Z.

When the valve is used in an installation in which the fuel pump is below the bottom of the tank, I find that, with the ball 17 omitted, the mercury will seal against a head of fuel of about 12". With a steel ball of ⁹⁄₁₆" diameter in an outlet tube having a guide section of ¹⁹⁄₃₂" inner diameter and a length of at least 1⅝", the valve will hold safely against a head of 22". The difference in head in each case is measured between the level of the bottom of the tank and the inlet to the pump. A ball of less size, such as ⅝", is not so satisfactory, since the valve does not hold so well and the action is somewhat erratic.

The single ball 17 may be replaced by a charge of small balls 23, as shown in Fig. 6, if the charge of balls used is such that the balls lie in close contact with one another and with the inner surface of the lower section 12a of the outlet tube. However, a valve containing a charge of the small balls will not hold against as great a head of fuel as a single ball of ⁹⁄₁₆" diameter. Instead of being solid, the ball or balls may be hollow and weighted by a suitable filling, such as a liquid heavier than gasoline, shot, etc. The hollow balls may be made of a synthetic material unaffected by gasoline, such as a suitable plastic.

If the valve is installed above the level of the top of the tank, no fuel will flow through the valve, when the pump stops or a break in the line beyond the valve occurs. However, the valve prevents leakage at the break, since the fuel in the line is drawn back toward the valve from the break.

I claim:

1. A shut-off valve which comprises a vessel having a closed lower end formed as a sump, a tube extending upwardly within the vessel and formed of a lower section with an open end within the sump and an upper section larger in diameter than the lower section and having a closed upper end, an inlet leading into the interior of the vessel outside the tube, an outlet leading from the interior of the upper section of the tube adjacent its closed upper end, a body of sealing liquid in the sump with its level normally above the lower end of the tube, and a relatively heavy ball within the tube and floating on the liquid, the ball having a diameter only slightly less than the inner diameter of the lower section of the tube and being movable upward into the upper section of the tube to allow passage of fluid through the valve from the inlet to the outlet.

2. A shut-off valve which comprises a vessel having a closed lower end formed as a sump, a tube extending upwardly within the vessel and formed of a lower section with an open end within the sump and an upper section larger in diameter than the lower section and having a closed upper end, an inlet leading into the interior of the vessel outside the tube, an outlet leading from the interior of the upper section of the tube below its closed upper end, a body of mercury in the sump with its level outside the tube normally lying above the lower end of the tube, and a relatively heavy ball within the tube and floating on the liquid, the ball having a diameter only slightly less than the inner diameter of the lower section of the tube and being movable upward into the upper section of the tube to allow passage of fluid through the valve from the inlet to the outlet.

3. A shut-off valve which comprises a vessel having a closed lower end formed as a sump, a tube extending upwardly within the vessel and formed of a lower section with an open end within the sump and an upper section larger in diameter than the lower section and having a closed upper end, an outlet leading from the interior of the upper section of the tube below its closed upper end, a body of mercury within the sump with its level outside the tube normally higher than the lower end of the tube, an inlet leading into the interior of the vessel outside the tube and above the level of the mercury, the volume of the vessel outside the tube and above the mercury being substantially greater than the volume of the tube above the level of the top of the outlet, and a relatively heavy ball within the tube and floating on the mercury and having a diameter only slightly less than the inner diameter of the lower section of the tube and being movable upward into the upper section of the tube to allow passage of fluid through the valve from the inlet to the outlet.

4. A shut-off valve which comprises a vessel having a closed lower end formed as a sump, a tube extending upwardly within the vessel and formed of a lower section with an open end within the sump and an upper section larger in diameter than the lower section and having a closed upper end, an outlet pipe leading from the interior of the upper section of the tube below its closed upper end, the pipe having a portion extending partly across the tube, a body of mercury within the sump with its level outside the tube normally higher than the lower end of the tube, an inlet leading into the interior of the vessel outside the tube and above the level of the mercury, and a relatively heavy ball within the tube and floating on the mercury, the ball having a diameter only slightly less than the inner diameter of the lower section of the tube and being movable upward into the upper section of the tube to allow passage of fluid through the valve from the inlet to the outlet, the distance between the inner end of the pipe and the adjacent surface of the tube being less than the diameter of the ball.

5. A shut-off valve which comprises a vessel having a closed lower end formed as a sump, a tube extending upwardly within the vessel and formed of a lower section with an open end within the sump and an upper section larger in diameter than the lower section and having a closed upper end, an outlet leading from the interior of the upper section of the tube below its closed upper end, a body of mercury within the sump with its level outside the tube normally higher than the lower end of the tube, an inlet leading into the interior of the vessel outside the tube and above the level of the mercury, the volume of the vessel outside the tube and above the mercury being more than twice the volume of the tube above the level of the top of the outlet, and a relatively heavy ball within the tube and floating on the mercury, the ball being of a diameter only slightly less than the inner diameter of the lower section of the tube and being movable into the upper section of the tube to allow passage of fluid through the valve from the inlet to the outlet.

6. A shut-off valve which comprises a vessel having a closed lower end formed as a sump, an outlet tube extending upwardly within the vessel and formed of a lower section with an open end within the sump and an upper section larger in diameter than the lower section and having a closed upper end, an outlet leading from the interior of the upper section of the tube below its closed upper end, a body of mercury in the sump with its level outside the outlet tube normally above the lower end of the outlet tube, a metal ball within the tube floating on the mercury, the ball having a diameter only slightly less than the inner diameter of the lower section of the outlet tube and being movable upward into the upper section of said tube to allow passage of fluid through the valve, an inlet tube within the vessel outside the outlet tube and having an open end below the outlet and above the level of the mercury and a closed upper end, and an inlet leading into the interior of the inlet tube below its closed upper end.

7. A shut-off valve which comprises a vessel having a closed lower end formed as a sump, an outlet tube extending upwardly within the vessel and formed of a lower section with an open end within the sump and an upper section larger in diameter than the lower section and having a closed upper end, an outlet leading from the interior of the upper section of the tube below its closed upper end, a body of mercury in the sump with its level outside the outlet tube normally above the lower end of the outlet tube, a metal ball within the tube floating on the mercury, the ball having a diameter only slightly less than the inner diameter of the lower section of the outlet tube and being movable upward into the upper section of the tube to allow passage of fluid through the valve, and an inlet leading into the interior of the vessel outside the outlet tube above the level of the mercury and below the level of the outlet, the volume of the vessel above the mercury and outside the tube being more than twice the volume of the tube above the level of the top of the outlet.

8. A shut-off valve for use in a line through which liquid is drawn by a pump, which comprises a vessel having a closed lower end of less diameter than the vessel elsewhere and serving as a sump, an outlet tube extending upwardly within the vessel and formed of a lower section with an open end within the sump and an upper section larger in diameter than the lower section and having a closed upper end, an outlet leading from the interior of the upper section of the outlet tube below its closed lower end and adapted to be connected to the intake of the pump, a body of mercury within the sump with its level outside the outlet tube normally above the lower end of the tube, an inlet leading into the interior of the vessel outside the outlet tube and above the level of the mercury and below the outlet, and a metal ball within the outlet tube floating on the mercury and of a diameter only slightly less than the inner diameter of the lower section of the outlet tube, the ball being movable upward into the upper section of the tube to allow passage of fluid through the valve from the inlet to the outlet.

9. A shut-off valve for use in a line through which liquid is drawn by a pump, which comprises a vessel having a closed lower end of less diameter than the vessel elsewhere and serving as a sump, an outlet tube extending upwardly within the vessel and formed of a lower section with an open end within the sump and an upper section larger in diameter than the lower section and having a closed upper end, an outlet leading from the interior of the upper section of the outlet tube below its closed lower end and adapted to be connected to the intake of the pump, a body of mercury within the sump with its level outside the outlet tube normally above the lower end of the tube, an inlet tube within the vessel outside the outlet tube having an open lower end above the sump and a closed upper end, an inlet leading into the interior of the inlet tube below its closed upper end, and a metal ball within the outlet tube floating on the mercury and of a diameter only slightly less than the inner diameter of the lower section of the outlet tube, the ball being movable upward into the upper section of the tube to allow passage of fluid through the valve from the inlet to the outlet, the volume of the vessel above the mercury and outside the tubes being substantially greater than the volume of the outlet tube above the level of the top of the outlet and said volume of the outlet tube being substantially greater than the volume of the inlet tube above the level of the top of the inlet.

References Cited in the file of this patent

UNITED STATES PATENTS

| Number | Name | Date |
|---|---|---|
| 1,258,696 | Milligan | Mar. 12, 1918 |
| 1,437,138 | Gray | Nov. 28, 1922 |
| 1,910,012 | Halsey | May 23, 1933 |
| 2,419,042 | Todd | Apr. 13, 1947 |

FOREIGN PATENTS

| Number | Country | Date |
|---|---|---|
| 557,469 | Germany | Aug. 24, 1932 |